May 7, 1968  R. A. DE REGNAUCOURT ET AL  3,382,007
RIM MOUNTING
Filed Aug. 16, 1966  2 Sheets-Sheet 1
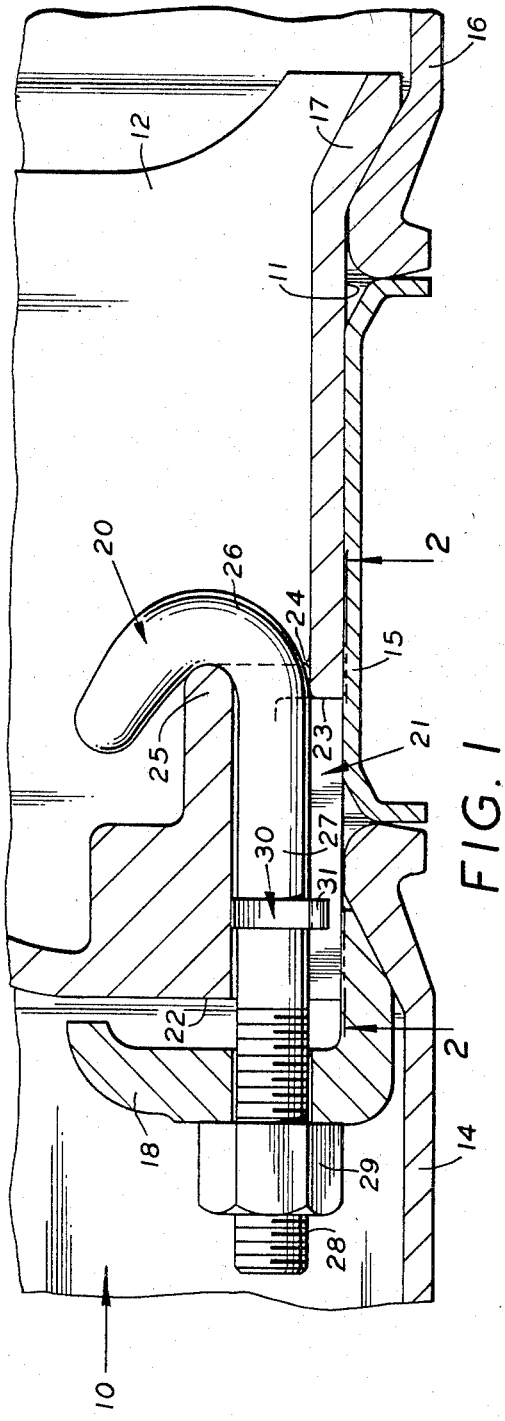
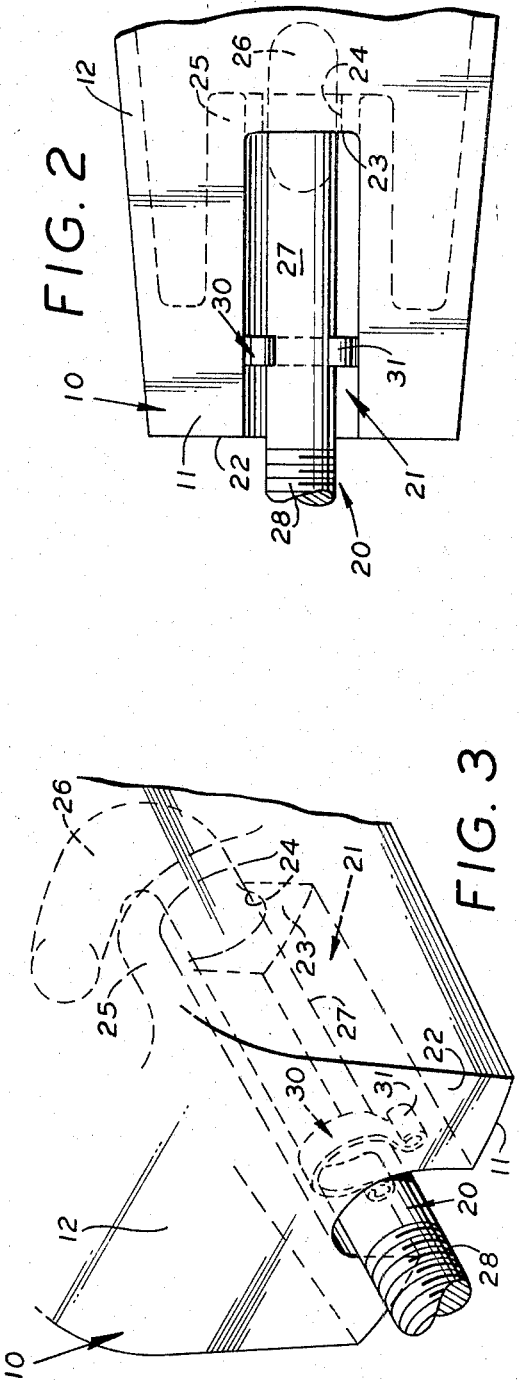
INVENTORS
ROBERT A. DEREGNAUCOURT
& WALTER E. BROWNELL
BY *Hamilton & Cook*
ATTORNEYS

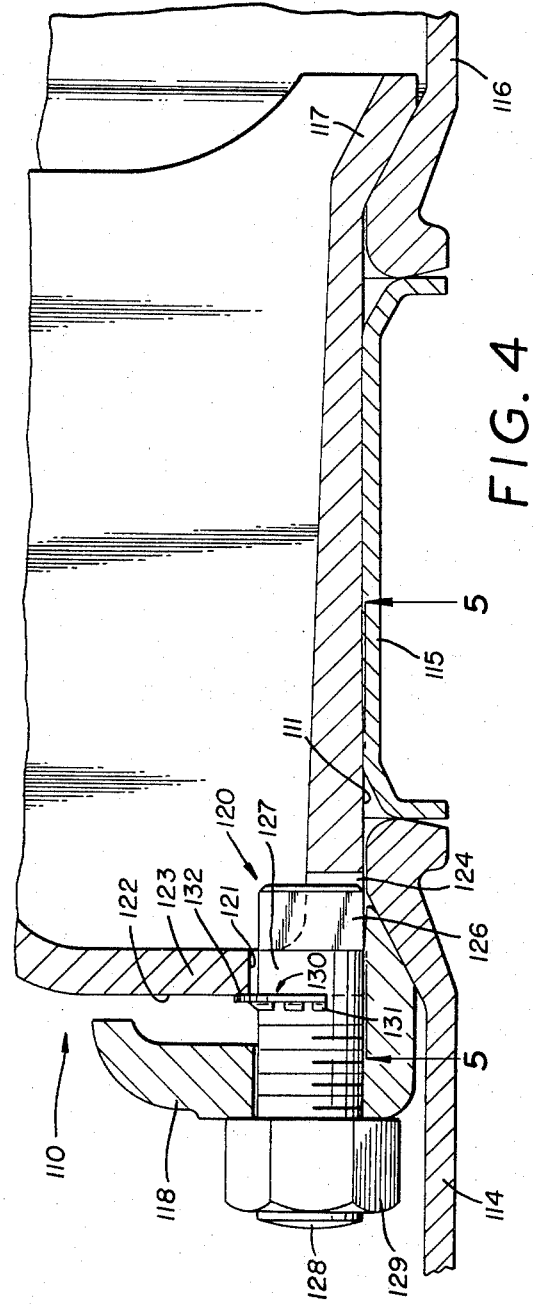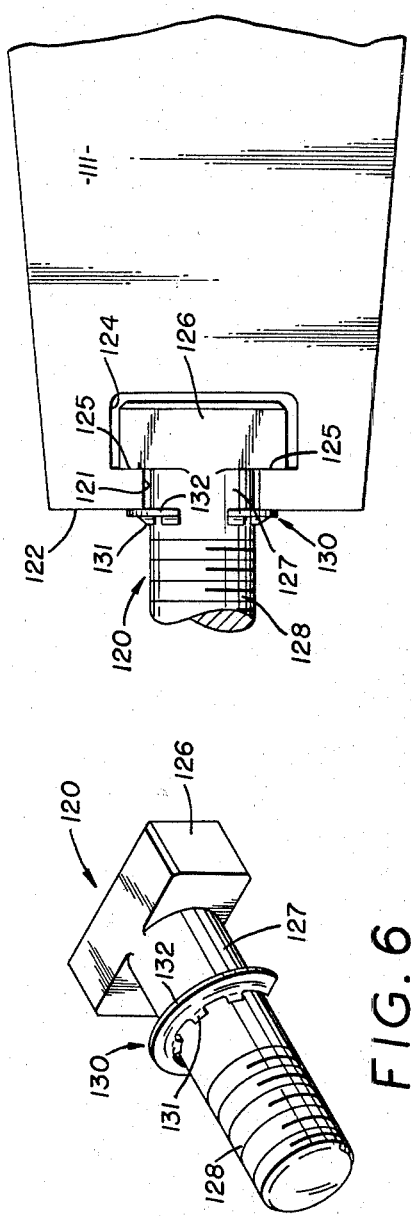

United States Patent Office 3,382,007
Patented May 7, 1968

3,382,007
RIM MOUNTING
Robert A. De Regnaucourt, Centerville, and Walter E. Brownell, Xenia, Ohio, assignors to The Dayton Steel Foundry Company, Dayton, Ohio, a corporation of Ohio
Filed Aug. 16, 1966, Ser. No. 572,837
1 Claim. (Cl. 301—13)

ABSTRACT OF THE DISCLOSURE

A clamping device in combination with a wheel on which one or more rims can be mounted. The rims are retained on the wheel by securing the clamping device to one end of a support bolt. An enlarged head on the other end of the support bolt is selectively interengageable with an anchor means in the wheel, and the shank of the support bolt is received within an axially oriented, radially recessed cove in the felly. A unique clip frictionally engages between the cove and the shank to hold the bolt in place while the rim is being mounted on the wheel.

---

The present invention relates to improvements for the mounting of rims on wheels. More particularly, the present invention relates to the mounting of detachable rims on a wheel by bolt supported clamp devices. Specifically, the present invention relates to the combination of a spoked wheel having a specially formed felly surface and mounting boss for cooperatively interlocking with bayonet anchored support bolts on which can be mounted conventional clamp devices used to detachably mount rims on the wheel.

In the prior art, the clamp devices have been supported by a threaded or screw-in type of stud bolt, extending axially outwardly from the terminal portions of the wheel spokes. (See, for example, element 25 in United States Patent No. 3,160,441, granted Dec. 8, 1964, to D. A. Walther et al.)

The concept of the present invention will eliminate the need for machine drilling and tapping the spoke ends, as required for the conventional screw-in type of stud bolt. Moreover, the present concept will reduce the amount of metal cast in the spoke ends. This directly reduces the tendency for internal stresses in the spoke ends caused by unequal cooling of the casting. Moreover, by eliminating the need for drilling and tapping, there will be no need for welding shrinkage cracks which sometimes occur when the internal stresses are relieved by the drilling.

A still further advantage of the present invention is that, should the bolt break in service, replacement is easier and more convenient. Furthermore, anchoring a clamp mounting bolt on the outermost corner portions of the wheel felly by a bayonet means which affords a self-aligning characteristic to the bolt will significantly reduce the likelihood that the loading which results from tightening of the clamp device will cause any bending and failure of the bolts.

Also, this tendency for the bolts to be self-aligning on the wheel not only reduces operating stresses but also permits larger tolerances during the wheel manufacturing operation.

Accordingly, it is the general object of the invention to improve the mounting of rims on the felly of a wheel by the use of bolt supported clamp devices. This and other objects of the invention, as well as further advantages thereof over existing and prior art forms, will be apparent in view of the following detailed description of the attached drawings and are accomplished by means hereinafter described and claimed.

Two alternative embodiments are shown by way of example in the accompanying drawings and hereinafter described in detail without attempting to show all of the various forms and modifications in which the invention might be embodied; the invention being measured by the appended claims and not by the details of the specification.

In the drawings:

FIG. 1 is a fragmentary sectional view of a wheel assembly in which the clamp device is supported by one form of a bolt constructed according to the concept of the present invention;

FIG. 2 is a plan view of the support bolt and the felly surface of the spoke end on which it is mounted, taken substantially on line 2—2 of FIG. 1;

FIG. 3 is a perspective view of a wheel spoke end on which is mounted that form of the clamp support bolt shown in FIGS. 1 and 2;

FIG. 4 is a view similar to FIG. 1 depicting an alternate form of clamp support bolt also embodying the concept of the present invention;

FIG. 5 is a view similar to FIG. 2 depicting the alternate form of the clamp support bolt; and, FIG. 6 is a perspective view of that form of the support bolt shown in FIGS. 4 and 5.

In general, a support bolt according to the concept of the present invention has a medial shank portion terminating at one end with a bayonet attachment means and at the other end wtih a securing means by which a clamping device can be secured to the wheel.

The wheel itself is provided with a radially outer felly surface upon which one or more rims can be carried.

The felly joins a boss means located on the axially outer side of the wheel at each location where a rim clamping device is to be employed, and at that juncture the axially outer portion of the felly is recessed. Axially inwardly of the axially outer, or outboard, side of the wheel the recess is provided with a shouldered anchor means.

The bayonet means on the support bolt is selectively interengageable with the anchor means and the shank of the support bolt is receivable within the recess so as not to interfere with the receipt of the rim, or rims, on the felly. The securing means may well consist of a threaded portion onto which a nut may be turned to tighten the clamping device against a rim.

As exemplary forms of the bayonet, or enlarged head, means, both a J-shaped and a T-shaped bayonet have been depicted and are described in detail below.

Referring more particularly to FIGS. 1–3 of the drawings, the wheel, indicated generally by the numeral 10, has a load bearing felly, or felly surface 11 on the terminal, or radially outer end, of each spoke member 12. As shown, the axial width of the felly 11 is sufficient to seat an outer rim 14, a spacer band 15 and an inner rim 16. The invention could also be employed to mount single rims of conventional width or to mount wide base rims (such as shown in United States Patent No. 3,160,-441 referred to above). In a conventional manner, the inner rim 16 is seated on the inclined surface of a flange portion 17 at the axially inner end of the felly 11; the spacer band 15 determines the distance between the rims 14 and 16; the outer rim 14 is seated on the axially outer portion of the felly 11; and, the entire assembly of inner rim-spacer band-outer rim is securely held on the wheel 10 by tightening of the bolt supported clamp device 18.

The bolt supported clamp device 18 depicted is a conventional one-piece clamp lug. However, the invention may be used with any suitable bolt supported clamp means or device including: a one-piece clamp lug with an axial slot in the rim clamping surface adapted to engage a driving lug of the mounting flange of a rim (see, for example, element 10 in United States Patent No. 3,039,824, granted June 19, 1962, to D. A. Walther); or, a two-piece rim clamp (see, for example, element 10 in United States Patent No. 3,013,842, granted Dec. 19, 1961, to D. A. Walther).

One form of the support bolt for the clamp device 18 is indicated generally by the numeral 20. Each support bolt 20 is received in a cove 21 recessed in the felly surface 11. The recess, or cove, 21 has a hollow, concave form and begins at the axially outermost, or outboard, face 22 of the wheel. In the wheel depicted the outboard face occurs on each spoke member 12 and also defines the outer face of the boss 23 which joins the felly 11 at each location where a rim clamping device 18 is to be employed.

At the inner end of each cove 21 a bore 24 extends through the boss 23 and beneath the felly 11 to form a shouldered anchor 25 on the boss 23. The J-shaped bayonet portion 26 of the bolt 20 is insertably receivable through said bore for selective interengagement with the anchor 25.

As clearly shown in FIG. 1, the shank, or medial, portion 27 of bolt 20 is of smaller diameter than the depth, at least measured radially, of the cove 21 so as to permit the bolt 20 to lie beneath the annular plane of the felly 11.

The axially outer portion 28 of bolt 20 is threaded to receive the tightening nut 29 for the clamp devices 18.

To hold the bolts 20 in place within the coves 21 while mounting or demounting the rims 14 or 16 and the spacer band 15, a resilient spring clip indicated by the numeral 30 may be used. Clip 30 is annularly discontinuous and may be fabricated out of spring steel so that the terminal portions 31 embrace the shank 27 of bolt 20 and frictionally engage the side walls of cove 21.

The coves 21 and the bores 24 may easily be formed at the time the wheels 10 are cast so that the felly surface 11 and the hub portions (not shown) would be the only wheel portions requiring a machining, or finishing, operation.

Referring now to FIGS. 4-6, depicting an alternative embodiment of the subject clamp supporting bolt, the wheel is indicated by the numeral 110. Here too, the axial width of the felly 111 is sufficient to seat an outer rim 114, a spacer band 115 and an inner rim 116. As is conventional, the inner rim 116 is seated on the inclined surface of a flange portion 117 at the axially inner end of the felly 111; the spacer band 115 determines the distance between the rims 114 and 116; the outer rim 114 is seated on the axially outer portion of the felly 111; and, the entire assembly of inner rim-spacer band-outer rim is securely held on the wheel 110 by tightening of the bolt supported clamp device 118.

Although, as also noted with bolts utilizing a J-shaped bayonet 26, numerous varieties of clamping devices may be used, only the conventional one-piece clamp 118 is depicted.

This second form of the support bolt for the clamp device 118 is indicated generally by the numeral 120. Each bolt 120 is received in a cove 121 recessed in the felly 111 at the outboard face 122 of the wheel where the boss 123 joins the felly.

At the inner end of the cove 121 a transverse notch 124 extends radially through the felly and into or, as shown, behind the boss 123 to form a shouldered anchor 125. The T-shaped bayonet portion 126 of the bolt 120 selectively interengages the anchor 125.

As is clearly shown in FIG. 4, the shank, or medial, portion 127 of bolt 120 is of smaller diameter than the depth, at least measured radially, of the cove 121 so as to permit the bolt 120 to lie beneath the annular plane of the felly 111.

The axially outer portion 128 of bolt 120 is threaded to receive the tightening nuts 129 for the clamp devices 118.

To hold the bolts 120 in place within the coves 121, particularly when mounting or demounting the rims 114 or 116 and the spacer band 115, a retaining clip indicated by the numeral 130 may be used. Clip 130 may be fabricated of spring steel and may be round or semi-circular having an axial portion 131 adapted to frictionally engage the shank 127 of support bolt 120. The peripheral portion 132 of clip 130 is adapted to seat against the outboard face 122 of the wheel and correctly position the support bolt for attachment of a tightening nut 129.

The cove 121 may also be formed during the metal casting operation producing the wheel 10, so that the felly surface 111 and the hub portions (not shown) are the only wheel portions requiring a machining, or finishing, operation.

It should therefore be readily apparent that mounting clamping devices with support bolts embodying the concept of the present invention not only greatly simplifies wheel manufacture but also equally facilitates service, maintenance and repair.

What is claimed is:

1. In combination with a wheel, a support bolt for securing a clamping device to said wheel for mounting one or more removable rims thereon, said wheel having a radially outer felly joining at least one boss means located on the outboard side of the wheel, an axially oriented cove radially recessed into the axially outer portion of said felly on the radially outer side of said boss means, said cove provided with a shouldered anchor means axially inwardly of the outboard side of said wheel, said support bolt having a shank the diameter of which is lesser than at least the radial depth of said cove, said shank received within said cove, an enlarged head means on one end of said shank selectively interengageable with said anchor means, a securing means on the opposite end of said shank by which said clamping device is tightened into operative position and an annularly discontinuous, resilient clip means frictionally engaging said shank, said clip means having terminal portions, said terminal portions frictionally engaging the side walls of said cove to hold said bolt therein while mounting a rim on said wheel.

References Cited

UNITED STATES PATENTS

| | | | |
|---|---|---|---|
| 1,640,063 | 8/1927 | Williams | 301—22 |
| 1,665,880 | 4/1928 | Hale | 301—18 X |
| 1,812,338 | 6/1931 | Holt | 301—20 X |
| 2,135,481 | 11/1938 | Brink | 301—12 X |
| 2,261,637 | 11/1941 | Ash | 301—13 X |
| 2,548,929 | 4/1951 | Ash | 301—13 |
| 3,304,124 | 2/1967 | Brown | 301—12 |

RICHARD J. JOHNSON, *Primary Examiner.*